US010351348B2

(12) United States Patent
Lilley

(10) Patent No.: US 10,351,348 B2
(45) Date of Patent: Jul. 16, 2019

(54) HAND TRUCK DEVICE

(71) Applicant: Southworth Products Corporation, Falmouth, ME (US)

(72) Inventor: Mark W. Lilley, Scarborough, ME (US)

(73) Assignee: SOUTHWORTH PRODUCTS CORPORATION, Falmouth, ME (US)

( * ) Notice: Subject to any disclaimer, the term of this patent is extended or adjusted under 35 U.S.C. 154(b) by 0 days.

(21) Appl. No.: 15/149,061

(22) Filed: May 6, 2016

(65) Prior Publication Data

US 2017/0101265 A1 Apr. 13, 2017

Related U.S. Application Data

(60) Provisional application No. 62/238,998, filed on Oct. 8, 2015.

(51) Int. Cl.
*B65G 7/04* (2006.01)
*B65G 67/02* (2006.01)
(Continued)

(52) U.S. Cl.
CPC .............. *B65G 7/04* (2013.01); *B62B 3/10* (2013.01); *B65G 67/02* (2013.01); *B66F 9/06* (2013.01);
(Continued)

(58) Field of Classification Search
CPC .. B62B 3/008; B62B 3/04; B62B 3/10; B62B 5/003; B62B 5/0053; B62B 2301/02;
(Continued)

(56) References Cited

U.S. PATENT DOCUMENTS 1,494,183 A 5/1924 Ohman
2,250,577 A 7/1941 Ernst
(Continued)

FOREIGN PATENT DOCUMENTS

DE 19508567 C2 7/1996
EP 0952066 A2 10/1999
(Continued)

OTHER PUBLICATIONS

International Search Report and Written Opinion dated Jan. 26, 2017 in corresponding PCT Patent Application No. PCT/US2016/056013.

*Primary Examiner* — Saul Rodriguez
*Assistant Examiner* — Ashley K Romano
(74) *Attorney, Agent, or Firm* — Grossman, Tucker, Perreault & Pfleger, PLLC

(57) ABSTRACT

A lifting device includes a body or frame, a track, a lifting mechanism having a trolley moveable relative to the track for lifting an object, a main set of wheels coupled to a base portion of the body/frame, a maneuvering set of wheels coupled to the base portion between at least a portion of the main set of wheels and the trolley and vertically offset from the main set of wheels, and at least one arm extending outwardly from the base portion. The vertical offset between the main set and the maneuvering set of wheels forms a two stage lever which improves the mechanical advantage of the lifting device, thereby decreasing the amount of force needed to recline the object being lifted by the lifting device.

14 Claims, 14 Drawing Sheets

(51) Int. Cl.
  *B66F 9/06* (2006.01)
  *B62B 3/10* (2006.01)
  *B62B 3/04* (2006.01)
  *B62B 3/00* (2006.01)
  *B62B 5/00* (2006.01)
(52) U.S. Cl.
  CPC ............... *B62B 3/008* (2013.01); *B62B 3/04* (2013.01); *B62B 5/003* (2013.01); *B62B 5/0053* (2013.01); *B62B 2203/10* (2013.01); *B62B 2301/02* (2013.01)
(58) Field of Classification Search
  CPC ...... B62B 2203/10; B65G 7/04; B65G 67/02; B66F 9/06
  See application file for complete search history.

(56) References Cited

U.S. PATENT DOCUMENTS

| | | | |
|---|---|---|---|
| 2,360,858 A | | 10/1944 | Ernst |
| 2,418,522 A | * | 4/1947 | Needham ............ B60B 29/002 280/47.12 |
| 2,598,489 A | * | 5/1952 | Bayer ..................... B62B 1/14 187/244 |
| 3,052,323 A | * | 9/1962 | Hopfeld ................. B62B 1/14 187/231 |
| 3,183,989 A | * | 5/1965 | Trusock ............... B62B 3/0612 180/13 |
| 3,499,658 A | | 3/1970 | Fernholz et al. |
| 4,130,212 A | | 12/1978 | Gatilao |
| 4,435,115 A | | 3/1984 | Orstad et al. |
| 4,561,674 A | | 12/1985 | Alessio |
| 4,737,065 A | | 4/1988 | Ju |
| 4,741,659 A | | 5/1988 | Berg |
| 4,776,603 A | * | 10/1988 | Watts ..................... B62B 1/12 280/47.27 |
| 4,902,187 A | | 2/1990 | Rousseau |
| 5,496,147 A | | 3/1996 | Taube |
| 5,501,497 A | | 3/1996 | Holloway |
| 6,315,310 B1 | | 11/2001 | Hurt |
| 6,893,201 B2 | * | 5/2005 | Clery ..................... B62B 3/02 280/47.34 |
| 7,219,903 B2 | * | 5/2007 | Grooters ................ B62B 1/125 280/47.131 |
| 7,926,599 B2 | | 4/2011 | Meyers |
| 8,556,279 B2 | | 10/2013 | McKinnon |
| 9,150,234 B2 | | 10/2015 | Beaver et al. |
| 2001/0038786 A1 | * | 11/2001 | Kim ....................... B62B 1/002 414/490 |
| 2002/0067983 A1 | | 6/2002 | McGill et al. |
| 2004/0256818 A1 | * | 12/2004 | Amsili ................... B62B 1/002 280/47.29 |
| 2007/0031231 A1 | | 2/2007 | Powell |
| 2009/0250889 A1 | | 10/2009 | Palmore |
| 2010/0021275 A1 | * | 1/2010 | Ratermann ............. B62B 1/14 414/454 |
| 2011/0243696 A1 | | 10/2011 | DiBenedetto |
| 2014/0145408 A1 | | 5/2014 | Midas et al. |
| 2014/0159328 A1 | | 6/2014 | Bowden |
| 2014/0319438 A1 | | 10/2014 | Carlson et al. |
| 2015/0175183 A1 | * | 6/2015 | Allos ..................... B62B 3/008 280/47.34 |

FOREIGN PATENT DOCUMENTS

| | | |
|---|---|---|
| FR | 2639932 | 6/1990 |
| FR | 2728885 | 7/1996 |
| GB | 822481 | 10/1959 |
| GB | 2303588 | 2/1997 |
| JP | 3227604 | 9/2001 |
| JP | 2005-170669 | 6/2005 |
| JP | 4778298 | 7/2011 |
| WO | 2010008773 | 1/2010 |
| WO | 2015019982 | 2/2015 |
| WO | 2015041128 | 3/2015 |

\* cited by examiner

HAND TRUCK DEVICE

PRIORITY CLAIM

This application claims the benefit of U.S. Provisional Patent Application Ser. No. 62/238,998 filed on Oct. 8, 2015 entitled HAND TRUCK DEVICE, which is fully incorporated in its entirety herein by reference.

TECHNICAL FIELD

The present invention relates to lifting devices and more particularly to hand trucks.

BACKGROUND

Generally, there is a need to move and lift heavy objects in a commercial or residential setting. One such way of lifting heavy objects involves the use of a manual device that utilizes various mechanical advantages to maneuver heavy objects. However, such devices generally require substantial physical exertion on behalf of the user.

BRIEF DESCRIPTION OF THE DRAWINGS

These and other features and advantages will be better understood by reading the following detailed description, taken together with the drawings.

DETAILED DESCRIPTION

Various embodiments of a lifting device will be described in context with the following figures. In particular, FIGS. 1-4 generally illustrate the lifting device alone and FIGS. 5-8 generally illustrate the lifting device of FIGS. 1-4 engaging an object to be lifted. The object to be lifted is generally depicted as being a keg in FIGS. 5-8 for the purposes of clarity and not by way of limitation.

Figure 1:
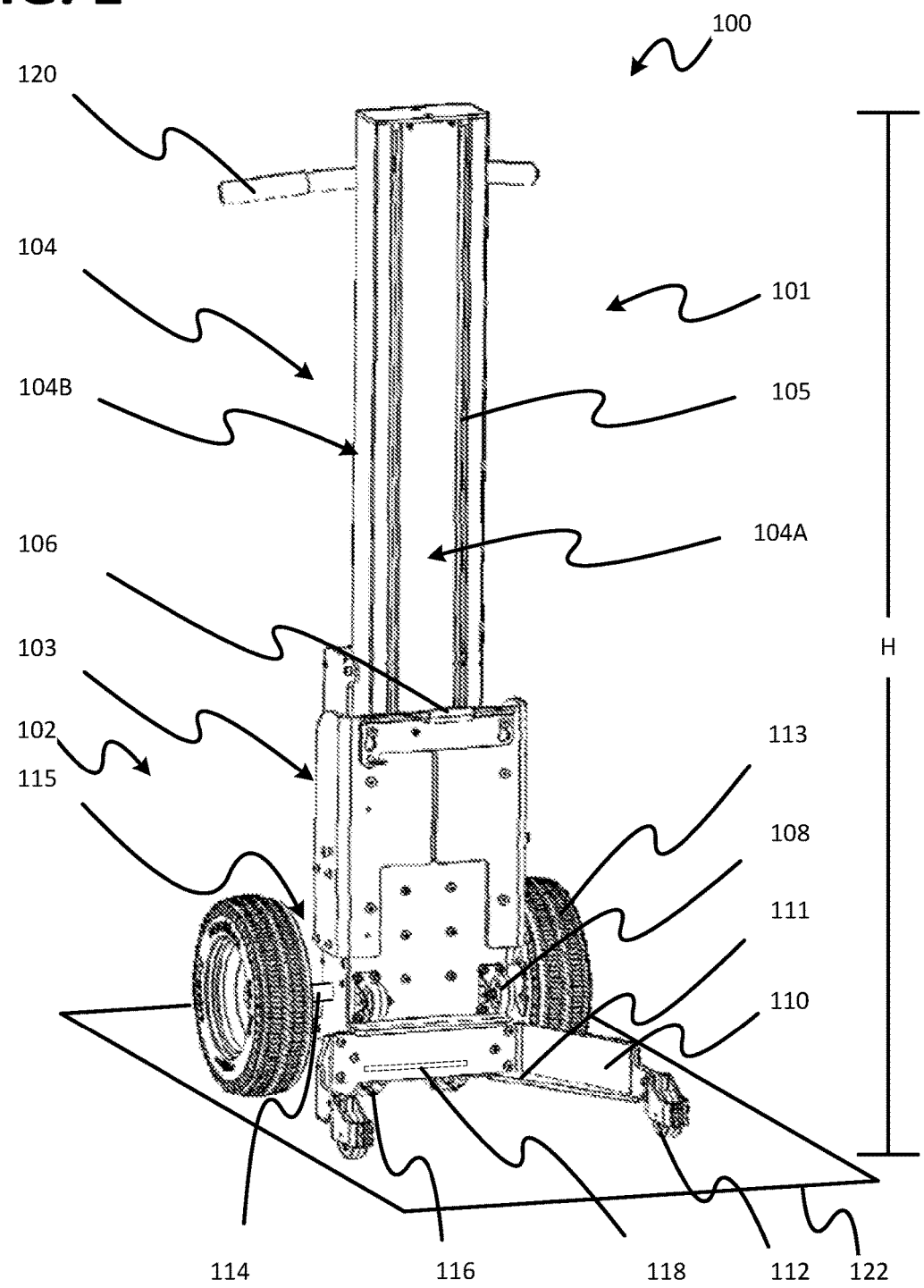
FIG. 1 is a perspective front view of a hand truck device consistent with the present disclosure.
Figure 5:
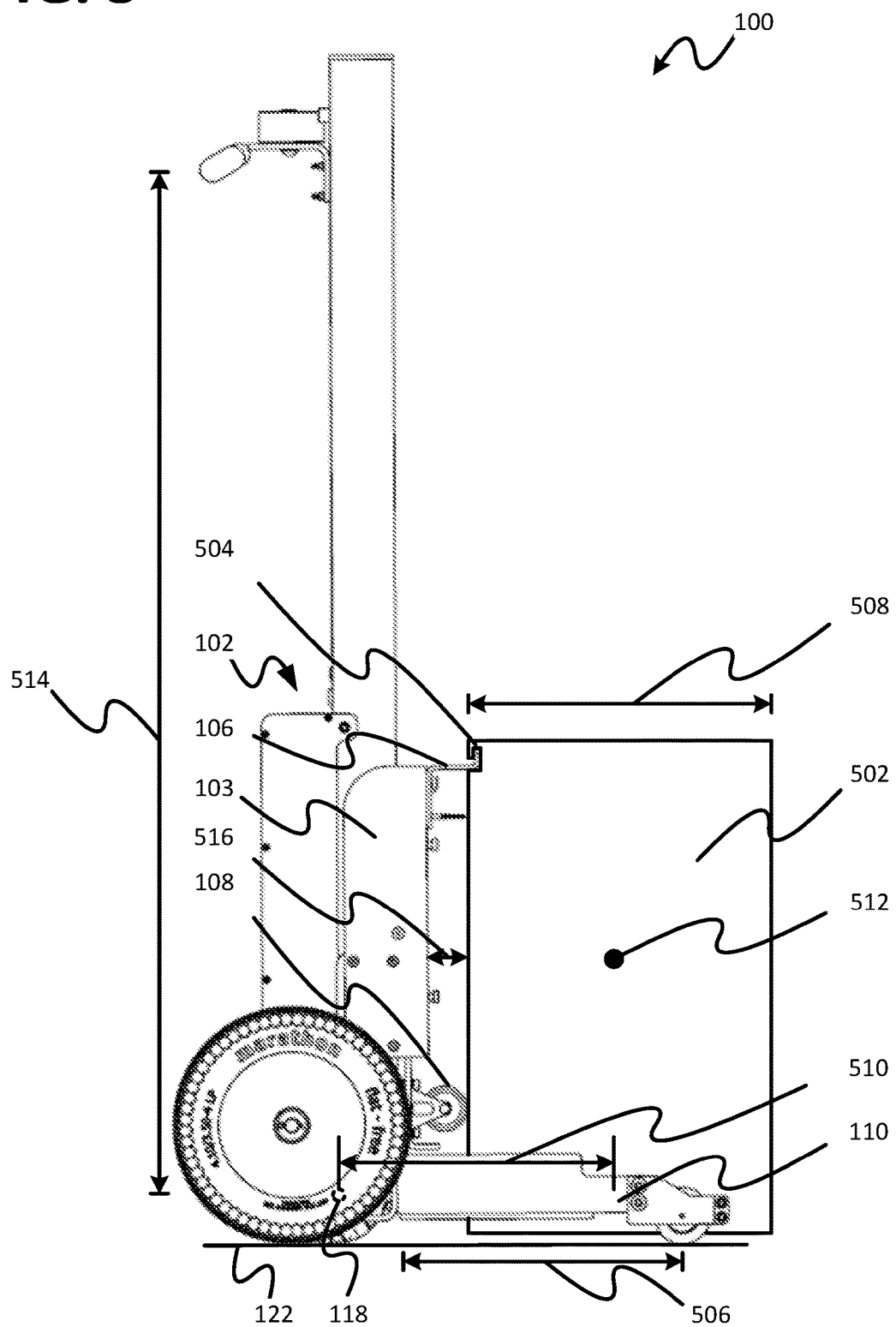
FIG. 5 is a side view of an example hand truck device consistent with the present disclosure holding a keg.

Referring now to FIGS. 1 and 5, a lifting device (also referred to herein as a hand truck) 100 is shown. The lifting device 100 may include a body or frame 101, a track 104, a lifting mechanism 102 having a trolley 103 moveable relative to the track 104 for lifting an object 502, a main set of wheels 113 coupled to a base portion 115 of the body/frame 101, a maneuvering set of wheels 116 coupled to the base portion 115 between at least a portion of the main set of wheels 113 and the trolley 103 and vertically offset from the main set of wheels 113, and at least one arm 110 extending outwardly from the base portion 115. As explained herein, the vertical offset between the main set and the maneuvering set of wheels 113, 116 may be used to form a two stage lever which improves the mechanical advantage of the lifting device 100, thereby decreasing the amount of force needed to recline the object 502 being lifted by the lifting device 100.

The frame 101 may provide support for the main set of wheels 113, the maneuvering set of wheels 116, and the one or more arms 110. For example, the main set of wheels 113 and maneuvering set of wheels 116 may be rotatably coupled to the base portion 115 of the frame 101, e.g., by way of one or more axles 114, 118. The base portion 115 of the frame 101 may be defined as the region of the frame 101 closest to the floor 122. For example, the base portion 115 may refer to a region of the frame 101 which is proximate to the floor 122 and that comprises ⅓ or less (e.g., ¼ or less or ⅕ or less) of the total height H of the frame 101.

In some embodiments, the frame 101 may include all or part of the track 104; however, the frame 101 may be a discrete element from the track 104. The frame 101 may also optionally include one or more handles 120. The handles 120 may be disposed anywhere along the height H of the frame 101. In some embodiments, the handles 120 may extend parallel and/or perpendicular to the axles 114, 118. The handle 120 may, at least partially, be wrapped in a shock absorbing material (e.g., an elastomeric material) to reduce user fatigue when using the handle 120. Optionally, the handle 120 may include braking controls (for one or more of the main wheel 113, the maneuvering wheel 116, and/or an arm wheel 112), controls for the lifting mechanism 102, and/or drive controls (for one or more of the main wheel 113, the maneuvering wheel 116, and/or the arm wheel 112).

Figure 6:
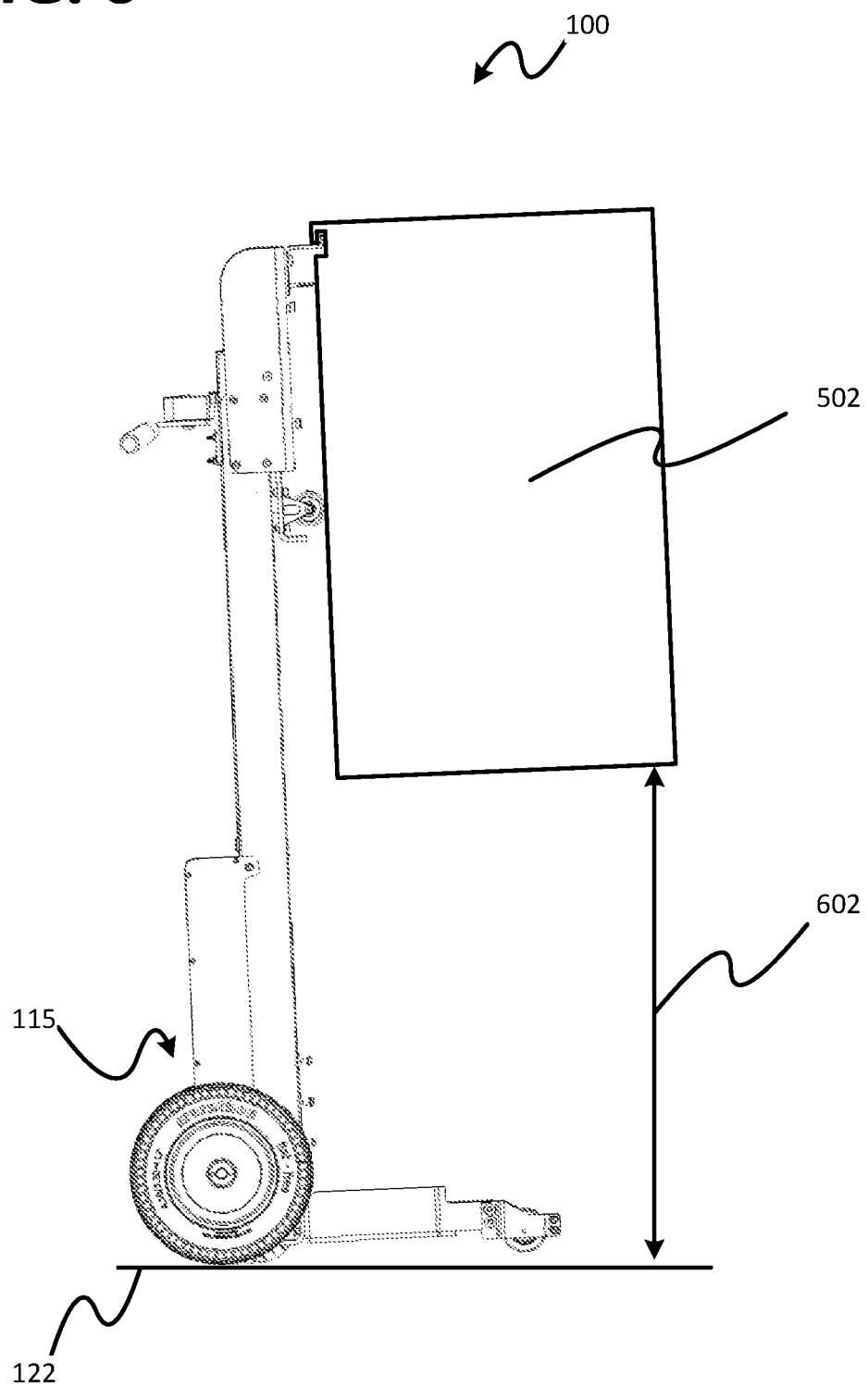
FIG. 6 is a side view of an example of a hand truck device consistent with the present disclosure being, at least partially, reclined and lifting a keg.

The lifting mechanism 102 includes a trolley 103 that is moveable with respect to the track 104 and is configured to lift and suspend an object 502 from the lifting device 100. For example, the lifting mechanism 102 may be configured to cause the trolley 103 to traverse the track 104 anywhere between a lowered portion (e.g., as generally illustrated in FIG. 1) and a raised position (e.g., as generally illustrated in FIG. 6).

In some embodiments, the track 104 may include one or more rails 105 that slidably engage and/or align the lifting mechanism 102 (e.g., the trolley 103) such that the trolley 103 moves along the track 104 according to a predetermined path. For example, the rails 105 may couple the lifting mechanism 102 (e.g., the trolley 103) to the track 104. The rails 105 may have a various shapes/configurations for coupling to the lifting mechanism 102 such as, but not limited to, a T-shape and/or an L-shape. The rails 105 may be located on any surface of the track 104 including, for example, a front surface 104A or a side surface 104B. The rails 105 may protrude from the track 104 and/or may be grooves formed and/or defined within the track 104. In some embodiments, the rails 105 include bearings, teeth, and/or rollers.

The trolley 103 (and/or lifting mechanism 102) may include a hook 106 (e.g., a bracket, a mount, a strap, a belt, a band, and etc.) to couple an object to the trolley 103 (and/or the lifting mechanism 102). For example, the hook 106 may engage a coupling point (e.g., a handle) of a pail, a bucket, a keg, a box, and other objects 502 capable of being lifted. As shown in FIG. 5, an object/keg 502 has a handle hold 504 that engages the hook 106 and once engaged the object 502 may be lifted using the lifting mechanism 102 to a determined height. In some embodiments, the hook 106 may be a bar, shaft, or rod having an L-shape, an S-shape, a U-shape, or any other shape capable of engaging an object 502 to be lifted. In other embodiments, the hook 106 may be a straight or angled shaft, bar, or rod. In some embodiments, the hook 106 may be a strap, belt, or band that, for example, engages the handle hold 504 and/or wraps around (e.g., circumscribes) the object 502. The hook 106 may be integral with the trolley 103 or may be mounted to the trolley 103 using, for example, bolt(s), adhesive(s), weld(s), friction fit(s), and other like methods of coupling.

In some cases, when the object 502 is positioned on the hook 106, the orientation of the object 502, relative to the lifting device 100, will change due to the object 502 pivoting when engaged with the hook 106. For example, when the object 502 is lifted, the object 502 may pivot on the hook 106 in the direction of the trolley 103 and the orientation of the object 502, relative to the lifting device 100, will change. Therefore, in some embodiments, to mitigate and/or prevent the object 502 from pivoting on the hook 106, at least one orientation mechanism 108 may be provided. For example, the orientation mechanism 108 may extend outwardly in the direction of the object 502 a distance substantially equal to a separation distance 516 (FIG. 5) between the object 502 and the trolley 103 when the object 502 engages the hook 106 but has yet to be lifted from the surface 122. In some embodiments, the orientation mechanism 108 may be adjustable. For example, the orientation mechanism 108 may be positioned at different vertical and/or horizontal locations on the frame 101 and/or the trolley 103 to accommodate different sized objects 502 to be lifted. Further, in some embodiments, there may be a plurality of orientation mechanisms 108. In these embodiments, the horizontal spacing between each orientation mechanism 108 may be adjustable.

Figure 10:
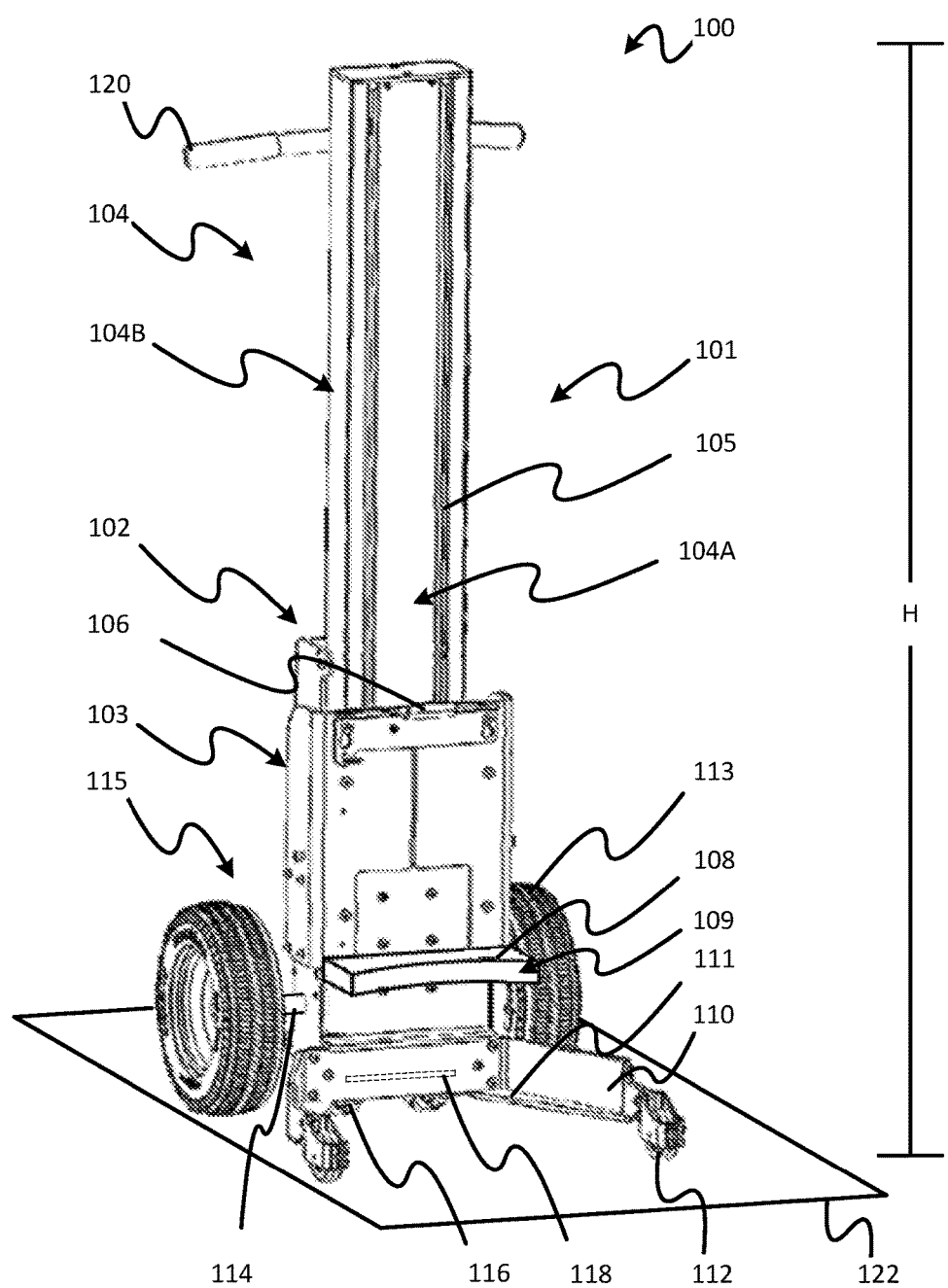
FIG. 10 is another perspective front view of a hand truck device consistent with the present disclosure.

The orientation mechanism 108 may include any one or more of a caster, a roller, a wheel (e.g., omnidirectional or single directional), a bearing, a shaft, a rod, a lip/protrusion, any similar mechanism that mitigates and/or prevents the pivoting of the object 502 when engaging the hook 106, and combinations thereof. The orientation mechanism 108 may be integral with the trolley 103 (and/or lifting mechanism 102) or may be mounted to the trolley 103 (and/or lifting mechanism 102) using, for example, bolt(s), weld(s), adhesive(s), friction fit(s), or other like methods of coupling. In some embodiments, the orientation mechanism 108 may not be mounted to the trolley 103 and may, for example, be mounted or affixed to the base portion 115 of the frame 101. Further, the orientation mechanism 108 may be removable such that different types and/or sizes can be used. For example, when the orientation mechanism 108 is a wheel (as generally shown in FIG. 1), a user may desire to change the orientation mechanism 108 to one or more lips/protrusions (as generally shown in FIG. 10).

As shown, for example, in FIGS. 1 and 5, positioning assistance may be provided by the inclusion of the at least one arm 110. The arm 110 may at least partially surround the object 502 to be lifted and act as a guide when positioning (and/or aligning) the lifting device 100 such that the hook 106 may engage the object 502. The arm 110 may extend outwardly in a forward direction (i.e., in the direction of the object 502 to be lifted) from the base portion 115 of the frame 101. The arm 110 may be integrally formed from the base portion 115 and/or mounted to the base portion 115 using, for example, bolt(s), adhesive(s), weld(s), friction fit(s), or other like methods of coupling. Additionally (or alternatively), the arm 110 may be integrally formed from, for example, the track 104 and extend outwardly from the track 104 in the direction of the trolley 103 and the object to be lifted. In other embodiments, the arm 110 may be mounted to the track 104 using, for example, bolt(s), adhesive(s), weld(s), friction fit(s), or other like methods of coupling. In some embodiments, there may be a plurality of arms 110 extending outwardly from the base portion 115.

Additionally, in some embodiments, regardless of where the arm 110 is mounted, the arm 110 may be mounted such that the arm 110 is not parallel with the horizontal plane (e.g., the floor 122). Furthermore, the angle of the arm 110 may be user adjustable such that the arm 110 is not parallel with the horizontal plane by, for example, allowing the arm 110 to pivot about its mounting point and/or by providing multiple mounting points. In some embodiments, the arm 110 may be user replaceable and/or adjustable to accommodate various sizes of objects 502 to be lifted.

As shown in FIG. 5, the arm 110 may, at least partially, circumscribe the object 502. Such a configuration facilitates the alignment of the lifting device 100 with the object 502. As is further shown, the arm 110 does not need to extend beyond all sides of the object 502. In other words, the arm length 506 may be less than the object width 508. The arm length 506 should be measured from a location where the arm 110 is attached to the lifting device 100 to a location where the arm 110 directly or indirectly engages (e.g., contacts) the floor 122. When there are multiple locations where the arm 110 directly or indirectly engages (e.g., contacts) the floor 122, the arm length 506 may be measured to the location of engagement (e.g., contact) furthest from the lifting device 100. The arm length 506 may, in part, be governed by the weight of the object 502 and the object width 508. In embodiments where the arm length 506 is greater than (or equal to) the object width 508, the lifting device 100 should not fall over as a result of lifting the object 502.

Once engaged, the object 502 to be lifted may be vertically raised on the track 104. As the lifting mechanism 102 raises the object 502, the arm 110 serves to resist the moment created at the base portion 115 of the frame 101. That is, the arm 110 prevents the lifting device 100 from falling forward as the object 502 is raised from a surface 122. As should be appreciated, in order for the arm 110 to resist the moment, the arm 110 generally will be in direct or indirect contact with the surface 122. As such, a force is exerted on the arm 110 and additional structural support may be provided by the inclusion of at least one plate 111 within the arm 110. In order to facilitate movement across the surface 122, the arm 110 may optionally include at least one arm wheel 112. The arm wheel 112 may be a roller, a caster, an omnidirectional wheel, a single direction wheel, a low friction material to permit sliding, any similar mechanism, or any combination thereof.

Once the object 502 is lifted to a determined distance, it becomes progressively easier to recline the lifting device 100 as the degree of recline of the lifting device 100 is increased. Once reclined, the object 502 may be transported using at least one main wheel 113 (e.g., an omnidirectional wheel, a caster, a roller, a single direction wheel, any similar mechanism, or combination thereof). The main wheel 113 may be disposed on at least one first axle 114 located, for example, at the base portion 115 of the frame 101.

By increasing the distance of the object 502 from the floor 122, the moment at the main wheel 113 (and/or first axle 114) changes as the degree of recline increases. For example, in FIG. 6, the lifting device 100 is shown in a reclined position after lifting the object 502 to a predetermined (or user determined) distance 602 from the floor 122. As a result of the reclining of the lifting device 100, a mechanical advantage is created and it becomes progressively easier to recline the lifting device 100 (e.g., in the direction of the user) as the degree of recline increases. In other words, the moment about the base portion 115 changes as a function of at least the predetermined (or user determined) distance 602 as the degree of recline increases.

Returning again to FIG. 1, the user may desire to maneuver the lifting device 100 prior to reclining the lifting device 100. In this situation, at least one maneuvering wheel 116 may be used. The maneuvering wheel 116 may be an omnidirectional wheel, a caster, a roller, a single direction wheel, any similar mechanism, or combinations thereof. In some embodiments, both the maneuvering wheel 116 and the arm wheel 112 may be omnidirectional wheels, allowing for additional positioning accuracy when, for example, engaging the object 502 to be lifted with the hook 106.

The maneuvering wheel 116 is positioned on at least one second axle 118 located, for example, at the base portion 115 of the frame 101. When the object 502 to be lifted is engaging to the hook 106, the second axle 118 may be disposed between the first axle 114 and the object 502. In some embodiments, it may be desirable to position the second axle 118 as close to the object 502 to be lifted as possible such that a horizontal distance 510 (see FIG. 5) between the second axle 118 and a mass center 512 of the object 502 is decreased/minimized. Additionally, it may be desirable to increase/maximize the vertical distance 514 (see FIG. 5) between the second axle 118 and the handle 120. By increasing/maximizing the vertical distance 514 the force required to recline the lifting device 100 may decrease.

In some embodiments, the second axle 118 may be positioned at a location between the first axle 114 and the trolley 103. Alternatively, the second axle 118 may be positioned in the same vertical plane as the first axle 114 (i.e., both the first axle 114 and the second axle 118 may be equidistant, in the horizontal plane, from the object to be lifted). In some embodiments, the maneuvering wheel 116 may be located between at least a portion of the main wheel 113 and the object to be lifted, the trolley 103, and/or the lifting mechanism 102. Furthermore, in some embodiments, the maneuvering wheel 116 (and/or the second axle 118) is between the arm wheel 112 and at least a portion of the main wheel 113 (and/or the first axle 114).

The use of both the maneuvering wheel 116 (and/or second axle 118) and the main wheel 113 (and/or the first axle 114) creates a two stage lever. That is, the maneuvering wheel 116 (and/or the second axle 118) serves as a first fulcrum point when the user initially reclines the lifting device 100 and the main wheel 113 (and/or the first axle 114) serves as a second fulcrum point when further reclining the lifting device 100. By utilizing dual fulcrum points, the user is required to apply less force to start the initial reclining of the lifting device 100 than if only one fulcrum point were used. It may be desirable for the maneuvering wheel 116 to be of a smaller diameter than the main wheel 113. To facilitate the different diameters, the first axle 114 and the second axle 118 may be vertically offset from each other (as generally shown by vertical offset 802 in FIG. 8). For example, the first axle 114 may also be in a different vertical plane than the second axle 118 (i.e., the first axle 114 and the second axle 118 may not be equidistant, in the horizontal plane, to the object 502).

In some embodiments, the main wheel 113 and the maneuvering wheel 116 may be positioned such that only one of either the main wheel 113 or the maneuvering wheel 116 contacts the floor 122 when the lifting device 100 is not in a reclined position. In this situation, the maneuvering wheel 116 and the arm wheel 112 serve to keep the lifting device 100 upright (i.e., both the maneuvering wheel 116 and the arm wheel 112 are in contact with the floor 122 prior to reclining the truck 100). However, once a force is applied to the handle 120 and the lifting device 100 reclines, the main wheel 113 may engage (e.g., contact) the floor 122. At this point, the maneuvering wheel 116 may no longer be in engagement (e.g., contact) with the floor 122. As such, any further reclining of the lifting device 100 occurs using the main wheel 113 (and/or the first axle 114) and the main wheel 113 may then be used to maneuver the lifting device 100 (i.e., the main wheel 113 may be used to transport the object 502). The larger diameter of the main wheel 113 may better facilitate the movement of the lifting device 100 once in the reclined position when compared to movement of the lifting device 100 using the smaller diameter maneuvering wheel 116.

Figure 7:
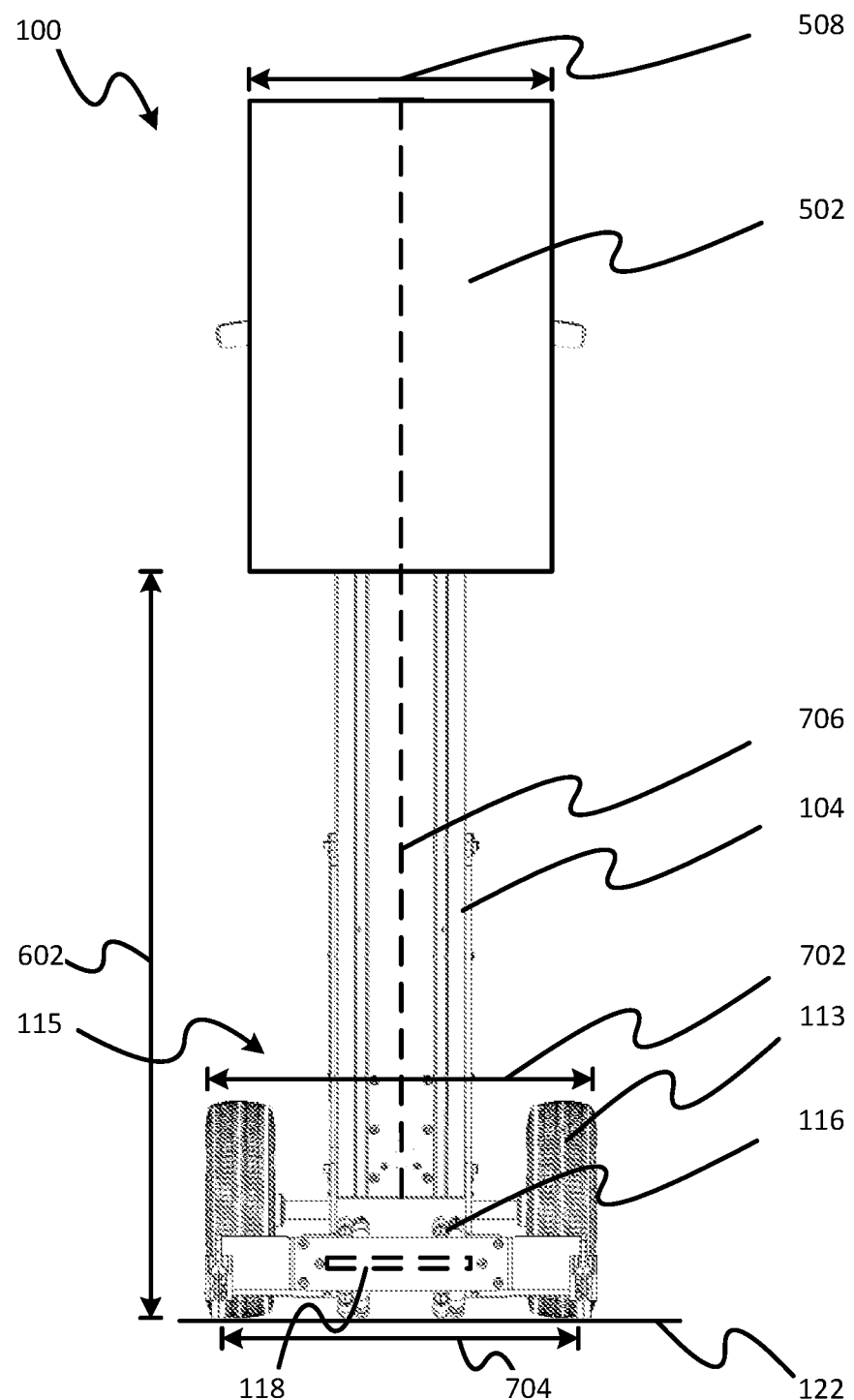
FIG. 7 is a front view of an example of a hand truck device consistent with the present disclosure lifting a keg.

As is further shown in FIG. 7, the main wheel 113 may be positioned such that a wheel spacing 702 is substantially equal to an arm width 704 in embodiments having a plurality of arms 110 extending outwardly from the base portion 115. In other words, the object width 508 is less than (or equal to) the wheel spacing 702 (and/or the arm width 704). Such a configuration may result in the lifting device 100 being more stable when in the reclined position. In other words, the lifting device 100 may be resistant to rotational movement about a vertical axis 706 of the track 104. As such, movement in the reclined position may become easier by requiring less user exertion.

Figure 2:
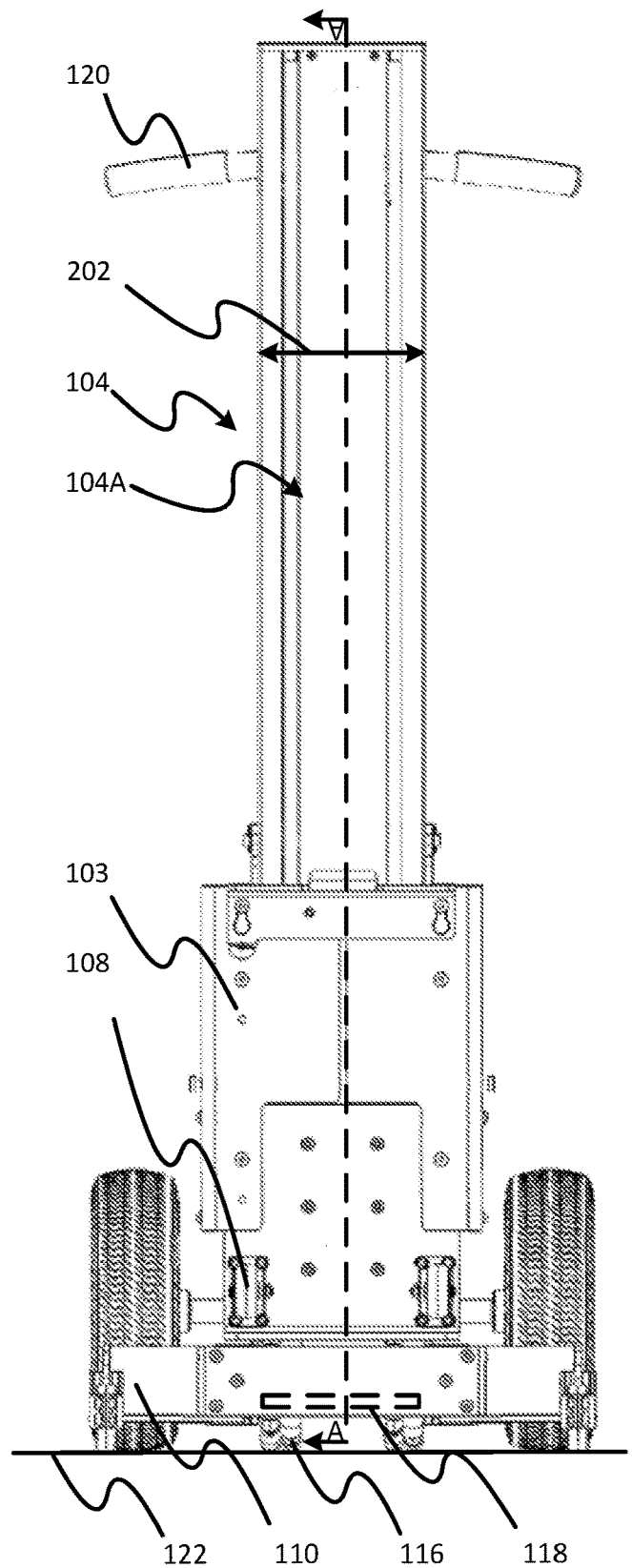
FIG. 2 is a front view of a hand truck device consistent with the present disclosure.

Referring also to FIG. 2, when there are a plurality of maneuvering wheels 116, the maneuvering wheels 116 may be positioned such that the separation distance between the maneuvering wheels 116 is less than a width 202 of the track 104. When there is a single maneuvering wheel 116, the width of the maneuvering wheel 116 may be less than the width 202 of the track 104.

Further, the maneuvering wheel 116 may be positioned such that the perimeter of the maneuvering wheel 116 is substantially flush with the trolley 103 and/or the front surface 104A of the track 104. By using such positioning, the second axle 118 may be located closer to the object 502 to be lifted without the maneuvering wheel 116 contacting the object 502 to be lifted, thereby decreasing the horizontal distance 510 (see FIG. 5) between the mass center 512 and the second axle 118. Therefore, in some embodiments, it may be desirable to design the maneuvering wheel 116 to have the smallest possible diameter while still being capable of supporting the weight/load of the object 502 to be lifted and such that the maneuvering wheel 116 remains in contact with the floor 122. In embodiments where the orientation mechanism 108 is utilized, the diameter of the maneuvering wheel 116 and/or the placement of the second axle 118 may be such that at least a portion of the maneuvering wheel 116 is located between the arms 110 without interfering with the object to be lifted.

Figure 3:
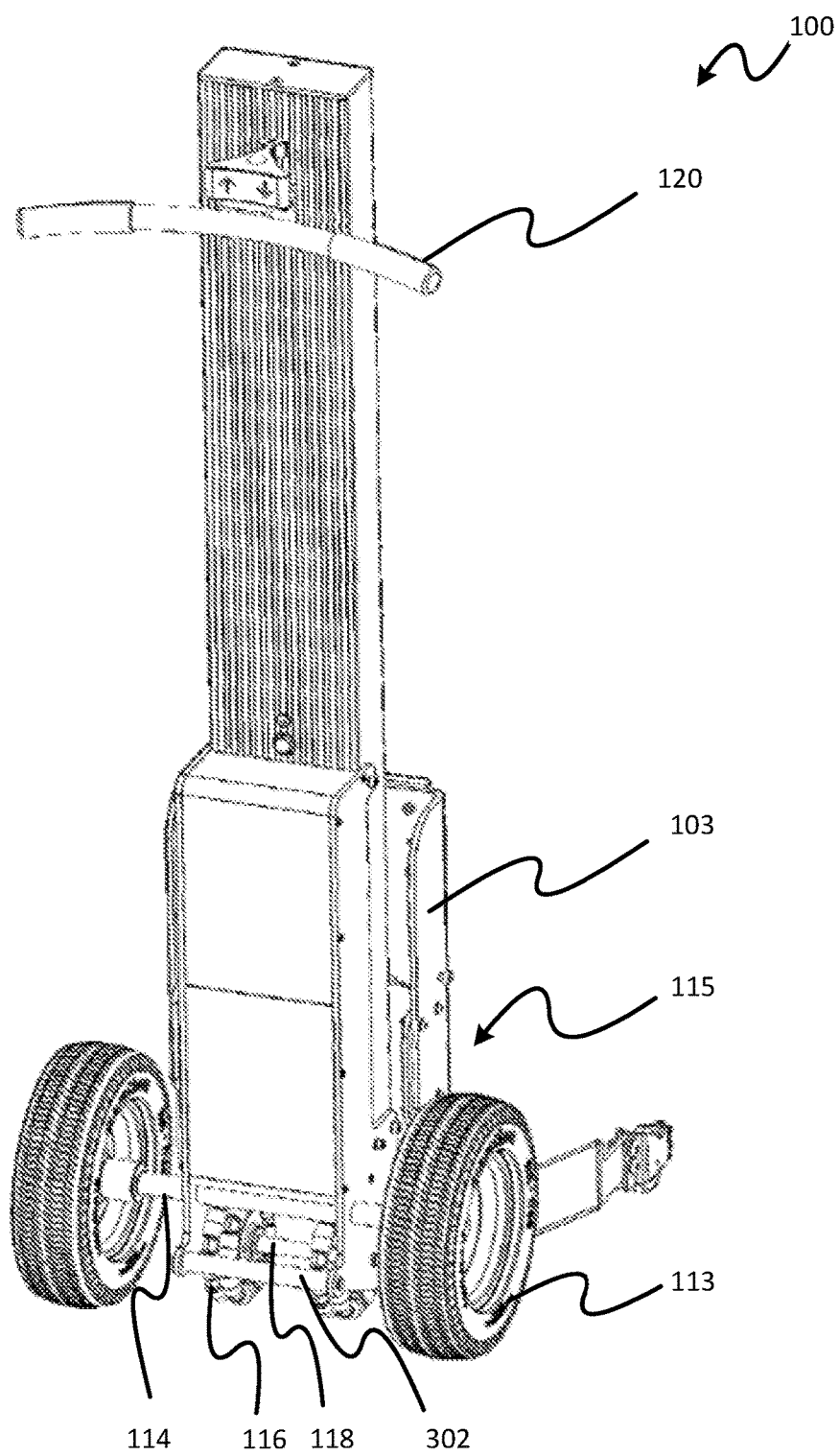
FIG. 3 is a perspective rear view of a hand truck device consistent with the present disclosure.
Figure 8:
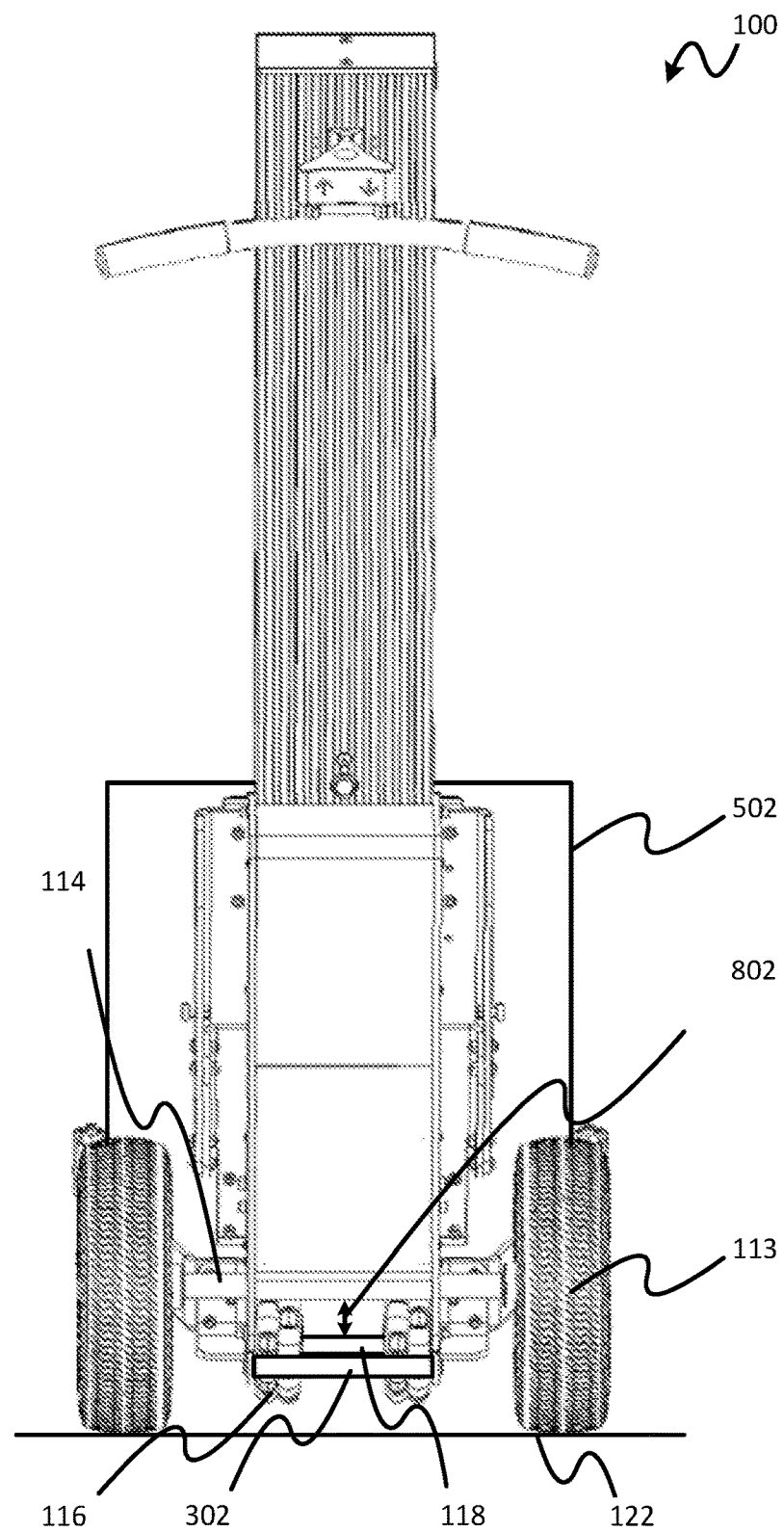
FIG. 8 is a rear view of an example of a hand truck device consistent with the present disclosure holding a keg.

Referring also to FIG. 3, the lifting device 100 may include a foot anchor point 302 at the base portion 115. The foot anchor point 302 may be used by the user to assist in reclining the lifting device 100. The foot anchor point 302 may represent an additional location at which the user may apply a force when reclining the lifting device 100. The application of such force may assist in the reclining of the lifting device 100 by reducing the amount of force required to be exerted by the user on the handle 120. In some embodiments, the main wheel 113 (and/or the first axle 114) and the maneuvering wheel 116 (and/or the second axle 118) are positioned between the trolley 103 (and/or lifting mechanism 102) and the foot anchor point 302. As illustrated in FIG. 8, the foot anchor point 302 may be positioned such that the first axle 114 and the second axle 118 are between the foot anchor point 302 and the object 502.

Figure 4:
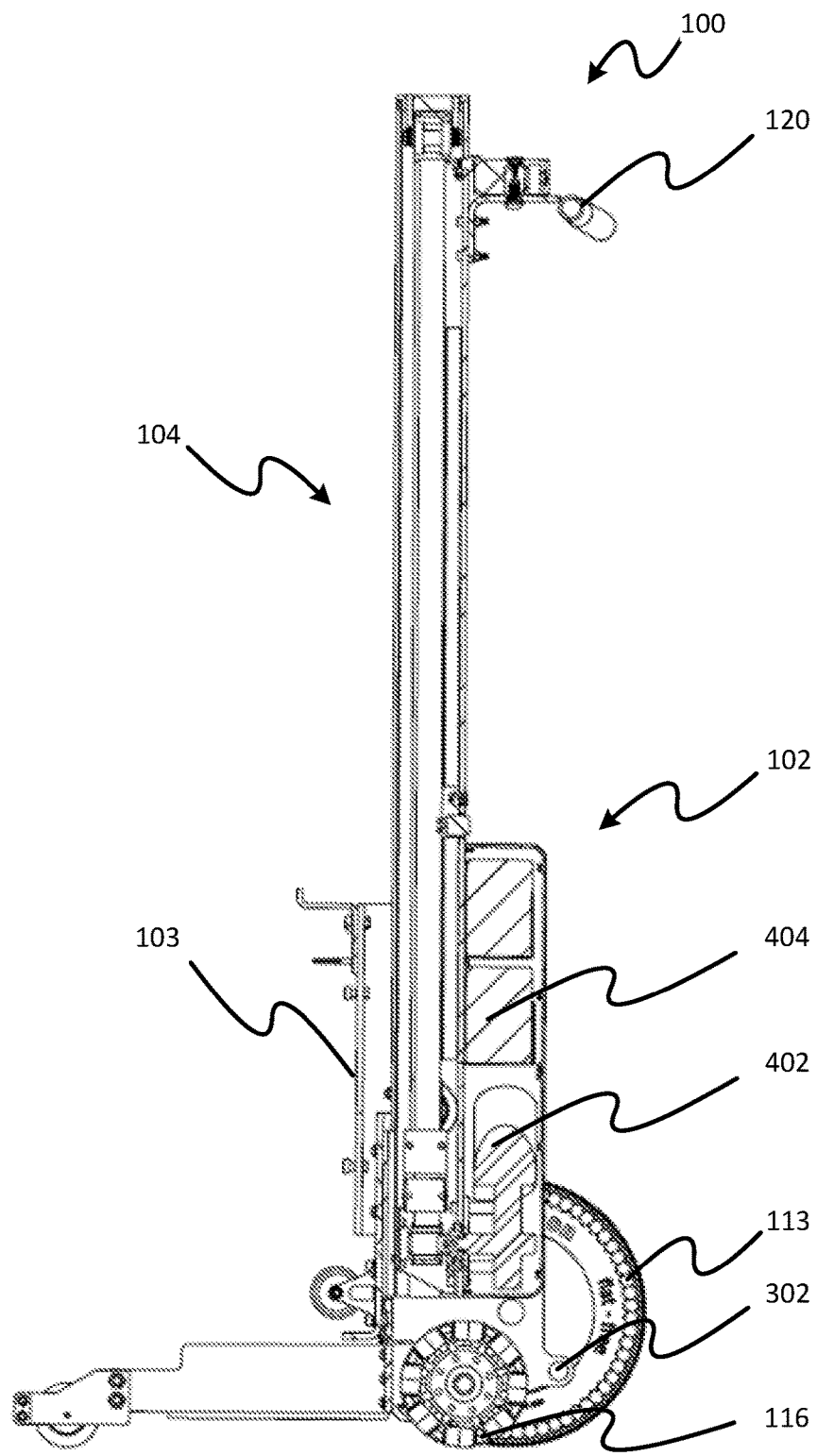
FIG. 4 is a cross-sectional view of a hand truck device taken along line A-A of FIG. 2 consistent with the present disclosure.

Referring now to FIG. 4, a cross-section of one embodiment of a lifting device 100 taken along A-A of FIG. 2 is shown. The lifting mechanism 102 may optionally include a drive mechanism 402. The drive mechanism 402 is configured to urge at least the trolley 103 along the track 104. In some embodiments, the drive mechanism 402 may urge the entire lifting mechanism 102 or only the trolley 103 along the track 104. In one embodiment, the drive mechanism 402 may comprise a motor that actuates a worm gear that serves to move the trolley 103 along the track 104. The drive mechanism 402 may comprise a chain and/or belt drive system that serves to move the trolley 103. Alternatively (or additionally), the drive mechanism 402 may comprise a hydraulic system that is either actuated using a non-manual pump (e.g., an electric pump) or manually actuated using a manual pump. For example, a manual pump may be integrated into the handle 120 or the foot anchor point 302. If the drive mechanism 402 utilizes a motor, at least one battery 404 may be provided. If the drive mechanism 402 utilizes an engine, the battery 404 may be replaced with a fuel supply for holding fuel (e.g., gasoline, natural gas, propane, etc.). It should be understood that if a motor or an engine is provided to drive the drive mechanism 402, the motor or the engine may be utilized to drive one or both of the maneuvering wheel 116 (and/or the second axle 118) or the main wheel 113 (and/or the first axle 114).

Figure 9:
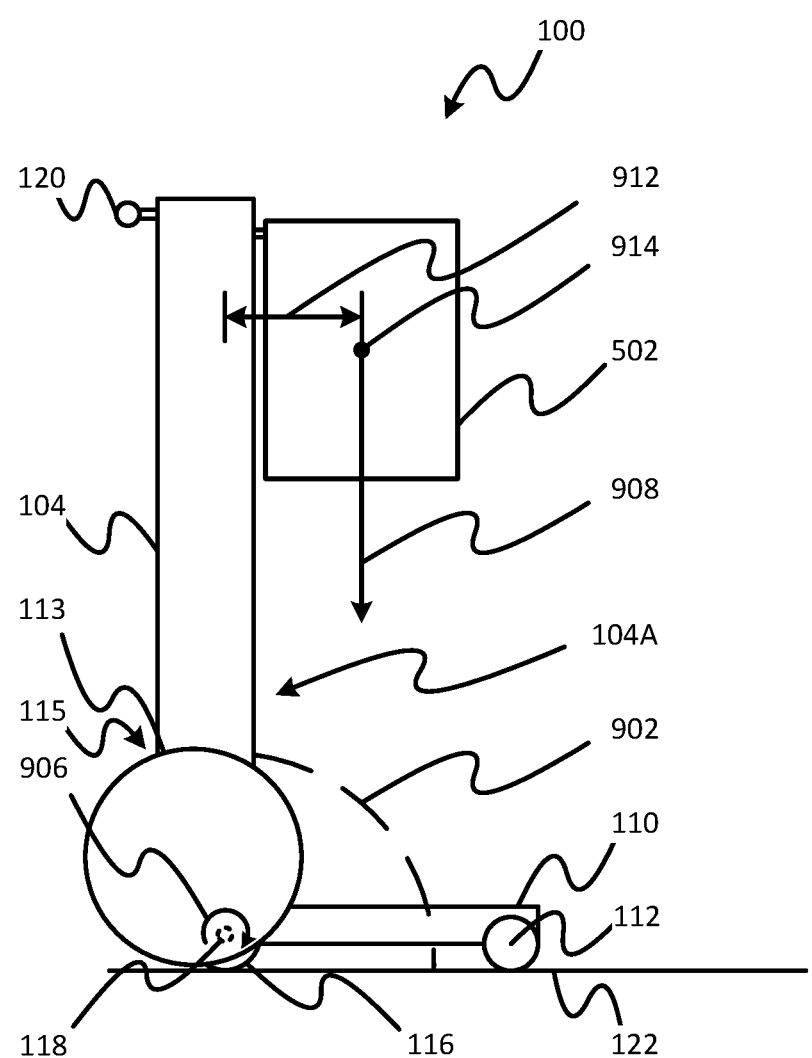
FIG. 9 is a side view of an example of a hand truck device consistent with the present disclosure.

Referring now to FIG. 9, a side view of one embodiment of a lifting device 100 consistent with the present disclosure is generally illustrated. The track 104 forms an angle 902 with the floor 122. The angle 902 may be measured between the front surface 104A of the track 104 (i.e., the surface of the track 104 facing an object 502) and the surface 122. As the angle 902 with the floor 122 increases, the moment 906 at the maneuvering wheel 116 (and/or the second axle 118) at the base portion 115 changes, which may make the lifting device 100 easier to recline.

The moment 906 about the lifting device 100 may at least be a function of a natural gravitational force 908 created by the weight of the object 502, a distance 912 in a plane parallel to the surface 122 (i.e., a horizontal plane) between a center of gravity 914 (of the object 502 and the lifting device 100) and the maneuvering wheel 116 (and/or the second axle 118), and the angle 902. As the angle 902 increases, the distance 912 in the horizontal plane between the center of gravity of the object 502 and the maneuvering wheel 116 (and/or the second axle 118) decreases. When the main wheel 113 engages (e.g., contacts) the surface 122 and the maneuvering wheel 116 disengages (e.g., comes out of contact with) the floor 122 the moment 906 will be at the main wheel 113 (and/or the first axle 114, not shown).

The angle 902 can be manipulated, for example, by beginning to recline the lifting device 100. As the lifting device 100 reclines, the angle 902 with the floor 122 increases (i.e., the angle 902 becomes greater than 90°). Additionally (or alternatively), the track 104 may be positioned such that the angle 902 is greater than 90° and less than 180° when the lifting device 100 is not being reclined. The angle 902 may be any angle between, for example, 90.0° and 90.1°, 90.1° and 91°, 91° to 105°, or 105° and 110°. More specifically, the angle 902 may be, for example, 90.01°, 90.1°, 91°, 92°, 93°, 100°, or any other angle, or range of angles, greater than 90° and less than 180°. In this situation, as the object 502 is raised, the distance 912 in the horizontal plane decreases, causing the moment 906 to change. The angling of the track 104 may be accomplished, for example, by using the arm wheel 112 and/or by mounting the track 104 such that the angle 902 is altered. Further, the angle 902 may be user adjustable by allowing the user to replace the arm wheel 112 such that the arm wheel 112 has a different diameter/size and/or by including an adjustment mechanism that allows the track 104 to be adjustably angled within the lifting device 100.

In some embodiments, similar reclining assistance may be achieved by providing a track 104 having a nonlinear configuration (e.g., a curvature in the direction of the user). As should be appreciated, the presence of a nonlinear configuration (e.g., a curvature) changes the location of the center of gravity 914 as the object 502 is moved along the track 104.

Additional reclining assistance may be provided by progressively adjusting the location of the object 502 on the track 104 while the lifting device 100 is being reclined. In other words, prior to being reclined, the object 502 may be positioned at a top end (e.g., the highest vertical location) of the lifting device 100. As the lifting device 100 is reclined the object 502 may progressively travel down the track 104 in the direction of the maneuvering wheel 116. In this manner, the moment 906 may be controlled and, in some embodiments, the moment 906 may remain substantially constant during the reclining of the lifting device 100.

Additionally (or alternatively), prior to reclining the lifting device 100, the object 502 may be positioned on the track 104 based, at least, on the height of the user of the lifting device 100. For example, the amount of recline desired by a tall user to comfortably use the lifting device 100 may be less than the amount of recline desired by a shorter user. The degree of recline to achieve a desired level of user comfort may be based, at least in part, on the position of the handles 120 relative to the body of the user.

The positioning of the object 502 may be initiated, for example, by the user inputting his/her general height (e.g., tall-stature, medium-stature, or short-stature) or a numerical value representing his/her height to a control system for the lifting device 100 using, for example, tactile button(s) or digital button(s). Additionally (or alternatively) the positioning of the object 502 may occur automatically (e.g., the user carries a radio transmitter that contains information identifying the user's height). Regardless, by positioning the object 502 on the track 104 based on the height of the user, the degree of recline required to balance the weight of the object 502 on the main wheels 113 may change.

In addition to user height, the positioning of the object 502 may also be based, at least in part, on the mass center of the object 502. The mass center of the object 502 may be determined through user input and/or sensors. For example, the lifting device may lift objects of generally standardized size and weight and, as such, the user may select the object type from a list of object types. In some instances, the user may enter a numerical value representing the weight of the object 502 and the control system of the lifting device 100 may calculate an estimated center of mass. In some embodiments, the lifting device 100 may include one or more sensors that are able to determine the center of mass for the object 502. Further, in some embodiments, the calculation of the center of mass of the object 502 may include, for example, the mass of the trolley 103 and/or lifting mechanism 102.

Figure 11:
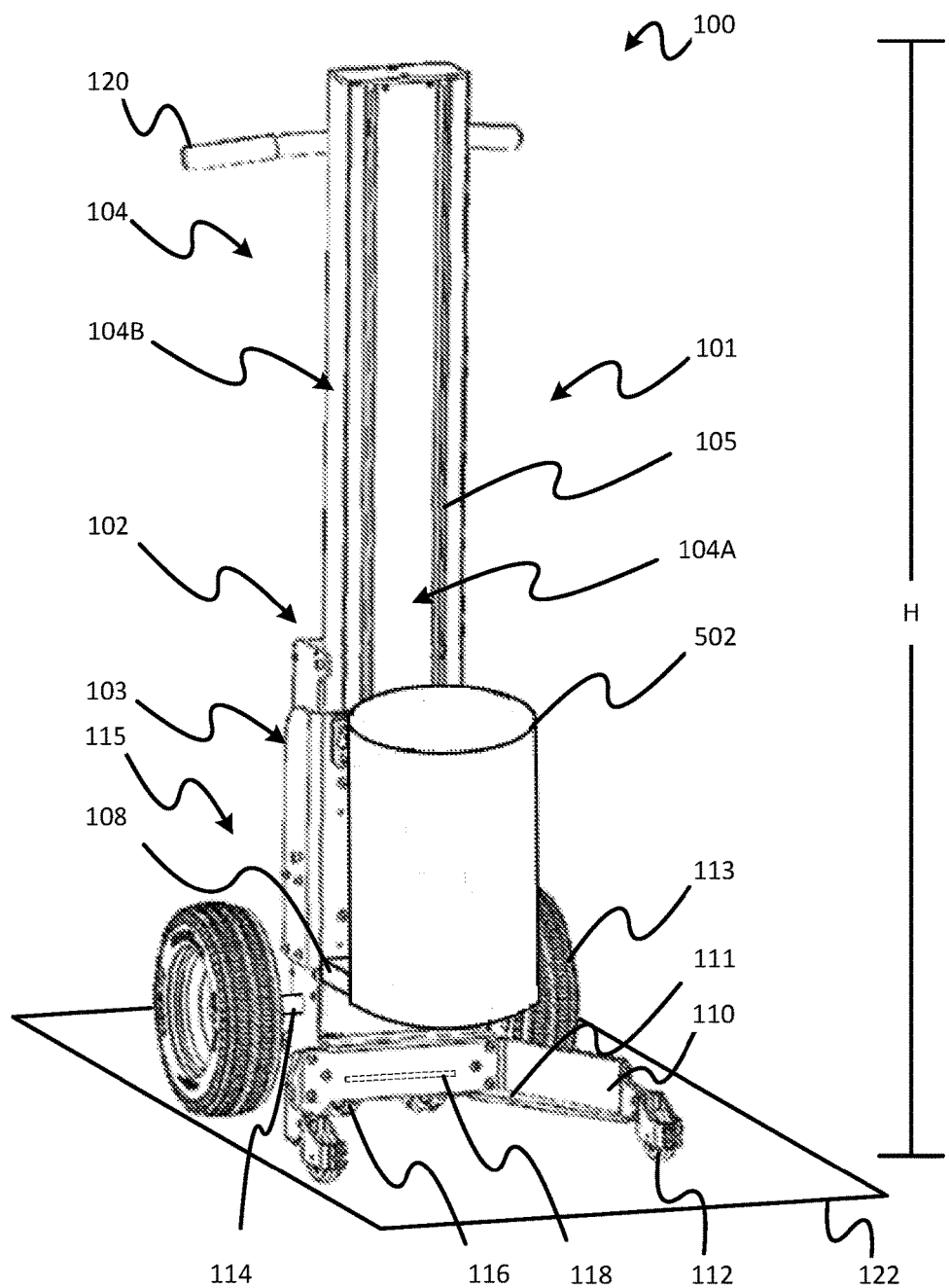
FIG. 11 is yet another perspective front view of a hand truck device consistent with the present disclosure.
Figure 12:
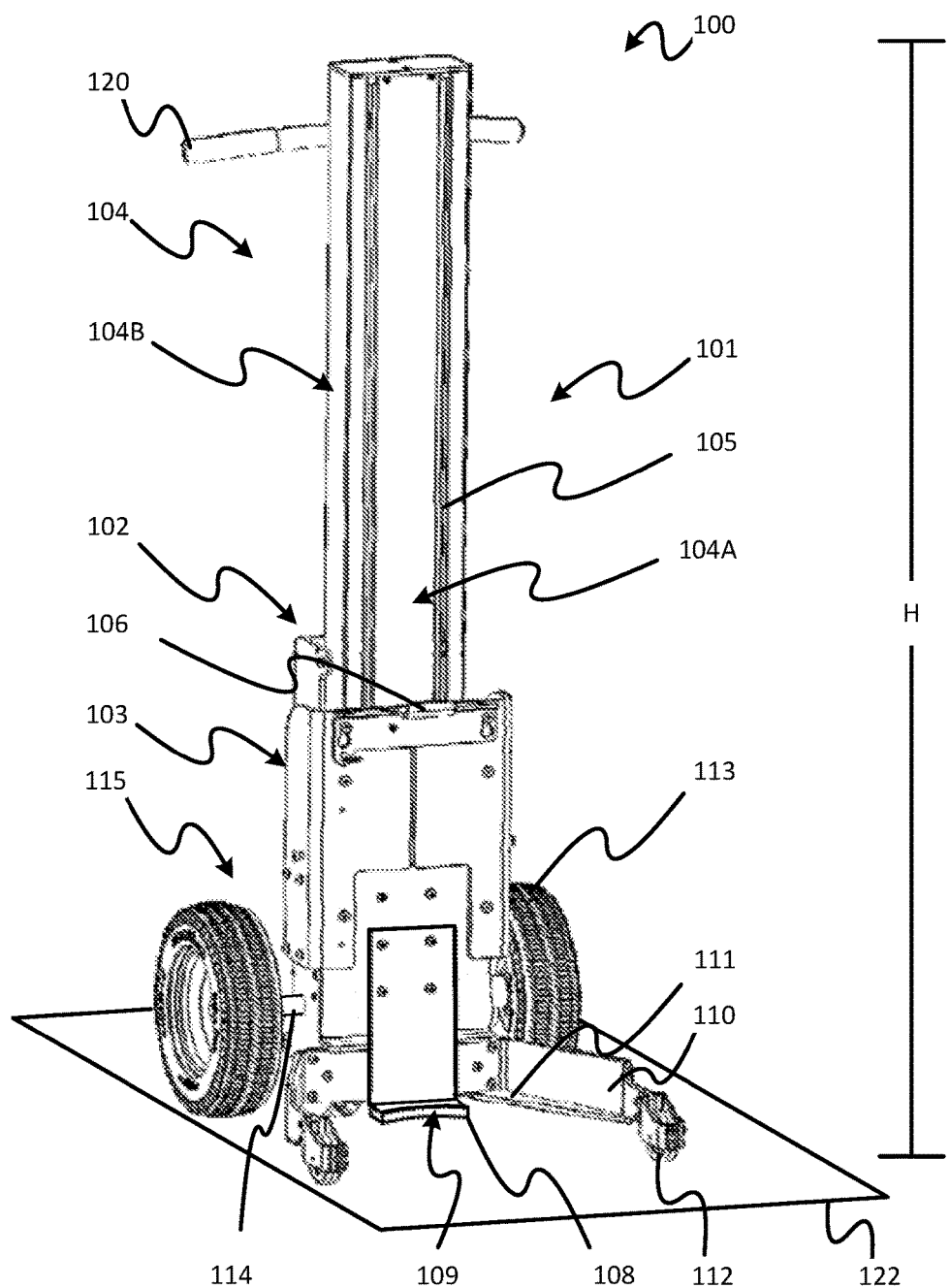
FIG. 12 is yet another perspective front view of a hand truck device consistent with the present disclosure.

As shown in FIGS. 10-12 the orientation mechanism 108 may be a protrusion/lip extending outwardly from the trolley 103. In these embodiments, the orientation mechanism 108 may include an engagement surface 109 that contacts (e.g., engages) the object 502. The engagement surface 109 may contact the object 502 at any location on the object 502. For example, as shown in FIG. 12, in some embodiments, the engagement mechanism 108 may extend downwardly from the trolley 103 in the direction of the surface 122 such that the engagement surface 109 may contact the object 502 at a location proximate to the bottom of the object 502. The engagement surface 109 may generally conform to at least a portion of the shape of the object 502. For example, when the object 502 is a cylindrical keg, the engagement surface 109 may have an arcuate shape. While in other embodiments, the engagement surface may not generally conform to the shape of the object 502. For example, when the object 502 is a cylindrical keg, the engagement surface 109 may be substantially planar.

Figure 13:
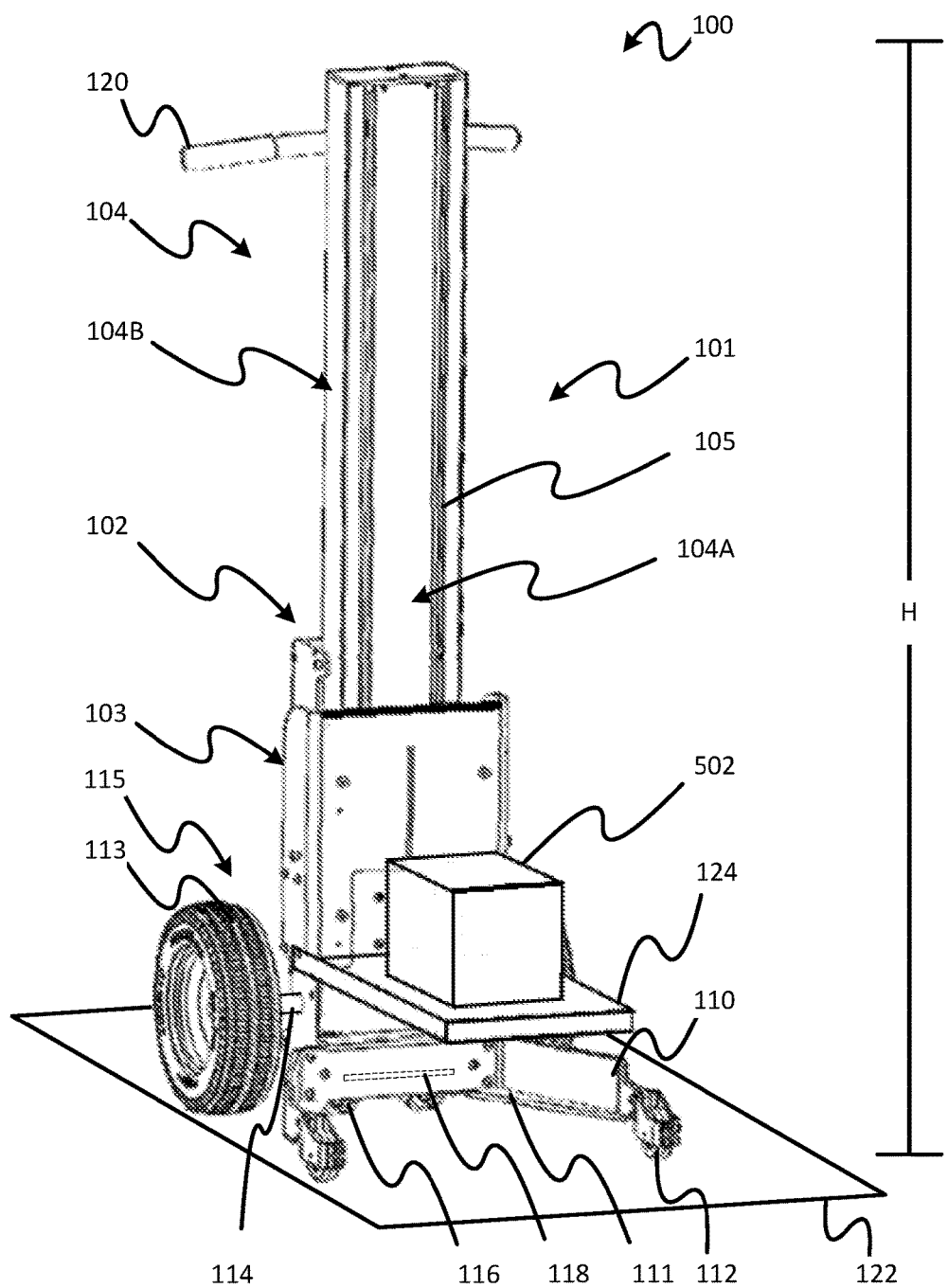
FIG. 13 is yet another perspective front view of a hand truck device consistent with the present disclosure.
Figure 14:
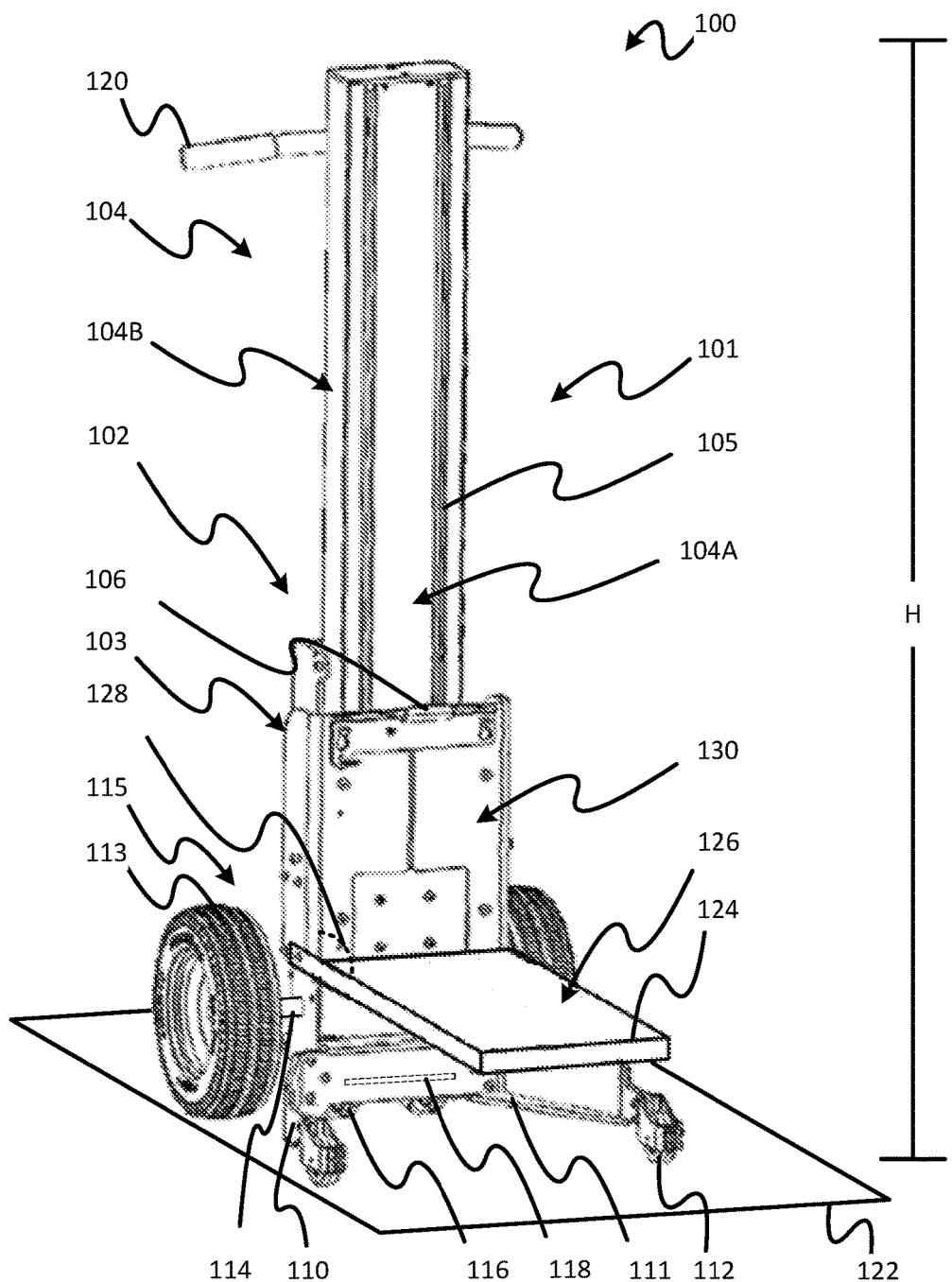
FIG. 14 is yet another perspective front view of a hand truck device consistent with the present disclosure.

As shown in FIGS. 13 and 14, a platform 124 may be used in addition to or instead of the hook 106. The platform 124 may be coupled to or integral with the trolley 103 such that the lifting mechanism 102 urges the platform 124 and the trolley 103 along the track 104. As shown in FIG. 13, the platform 124 extends outwardly from the trolley 103 in the direction of the object 502 such that when the object 502 is positioned on the platform 124, the object 502 is urged along the track 104. In some embodiments, the platform 124 may be parallel with the surface 122. For example, as shown in FIG. 14, a top surface 126 of the platform 124 may form an angle 128 with a front surface 130 of the trolley 103 that is substantially equal to ninety degrees. While in other embodiments, the platform 124 may not be parallel with the surface 122. For example, the angle 128 may be less than ninety degrees.

The platform 124 may be sized such that the object 502 does not extend beyond the perimeter of the platform 124. Alternatively, the platform 124 may be sized such that the object 502 extends beyond at least a portion of the perimeter of the platform 124. The platform 124 may be made of any material of sufficient strength to support the object 502, for example, the platform 124 may be made of various metal alloys, plastics, composites, combinations thereof, and the like. In some embodiments, the platform 124 may have one or more openings extending through the platform 124. In some embodiments, the platform 124 may also be used in addition to the orientation mechanism 108. While, in other embodiments, the platform 124 may be used without the orientation mechanism 108.

In one aspect of the present disclosure, a lifting device includes a track extending generally upward relative to a base portion of the lifting device, a lifting mechanism featuring a trolley configured to slidably engage the track and a drive mechanism configured to urge the trolley upwardly along the track, a main set of wheels coupled to the base portion, a maneuvering set of wheels coupled to the base portion between at least a portion of the main set of wheels and the trolley, wherein the main set and the maneuvering set of wheels are coupled to different axles, vertically offset from each other, and at least one arm extending outwardly from the base portion. Optionally, the lifting device may include a at least one arm wheel coupled to the at least one arm.

In another aspect of the present disclosure, a lifting device may include a lifting mechanism slidably engaging a track, the track having a base portion, a first set of wheels coupled to the base portion of the track, and a second set of wheels coupled to the base portion of the track between at least a portion of the first set of wheels and the lifting mechanism.

In yet another aspect, a method for lifting an object using a lifting device may include aligning the object with at least one arm having at least one arm wheel coupled thereto, the at least one arm may extend outwardly from a base portion of the lifting device. The method may further include coupling the object to a trolley that may slidably engage a track, wherein the track may be coupled at the base portion of the lifting device and may extend generally upward relative to the base portion. The method may also include moving the trolley along the track. The method may still further include reclining the lifting device on a surface using a maneuvering set of wheels coupled at the base portion of the lifting device. The method may also include contacting the surface with a main set of wheels. Additionally, the method may include reclining the lifting device using the main set of wheels, wherein only the at least one arm wheel and the maneuvering set of wheels are in contact with the surface prior to reclining to the lifting device.

While the principals of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A lifting device comprising:
   a track extending generally upward relative to a base portion of the lifting device the lifting device having an upright position wherein an angle is defined between the track and a surface from which an object is to be lifted and being movable to a reclined position wherein the angle defined between the track and the surface from which the object is to be lifted is increased;
   a lift comprising:
   a trolley slidably engaging the track; and
   a drive to urge the trolley upwardly along the track;
   a main set of wheels coupled to the base portion;
   a maneuvering set of wheels coupled to the base portion, the maneuvering set of wheels being positioned to engage the surface from which the object is to be lifted when the lifting device is in the upright position, wherein the main set of wheels are coupled to at least one first axle and the maneuvering set of wheels are coupled to at least one second axle, the first axle being substantially parallel to the second axle and at least a portion of the second axle being positioned between the first axle and the trolley in the upright and reclined positions, wherein the first and second axles are vertically offset from each other such that the main set of wheels are positioned to be disengaged from the surface when the lifting device is in the upright position and in response to the lifting device being moved to the reclined position to lift the object from the surface, the maneuvering set of wheels disengage the surface and the main set of wheels engage the surface; and at least one arm extending outwardly from the base portion.

2. The lifting device of claim 1, wherein the maneuvering set of wheels are omnidirectional.

3. The lifting device of claim 1, wherein the main set of wheels are larger than the maneuvering set of wheels.

4. The lifting device of claim 1, further comprising a foot anchor point disposed on the base portion.

5. The lifting device of claim 4, wherein the first and second axles are positioned between the foot anchor point and the trolley.

6. The lifting device of claim 1, wherein the main set and the maneuvering set of wheels are aligned in different vertical planes.

7. The lifting device of claim 1, wherein the track includes the base portion.

8. The lifting device of claim 1, further comprising a frame, wherein the frame includes the base portion.

9. A lifting device comprising:
a track extending generally upward relative to a base portion of the lifting device the lifting device having an upright position wherein an angle is defined between the track and a surface from which an object is to be lifted and being movable to a reclined position wherein the angle defined between the track and the surface from which the object is to be lifted is increased;
a lift comprising:
  a trolley slidably engaging the track; and
  a drive to urge the trolley upwardly along the track;
a main set of wheels coupled to the base portion;
a maneuvering set of wheels coupled to the base portion, the maneuvering set of wheels being positioned to engage the surface from which the object is to be lifted when the lifting device is in the upright position, wherein the main set of wheels are coupled to at least one first axle and the maneuvering set of wheels are coupled to at least one second axle, the first axle being substantially parallel to the second axle and at least a portion of the second axle being positioned between the first axle and the trolley in the upright and reclined positions, wherein the first and second axles are vertically offset from each other such that the main set of wheels are positioned to be disengaged from the surface when the lifting device is in the upright position and in response to the lifting device being moved to the reclined position to lift the object from the surface, the maneuvering set of wheels disengage the surface and the main set of wheels engage the surface, wherein the main set of wheels are larger than the maneuvering set of wheels;
at least one arm extending outwardly from the base portion in a direction of an object to be lifted when the object to be lifted engages the trolley; and
at least one arm wheel coupled to the at least one arm.

10. The lifting device of claim 9, wherein, the maneuvering set of wheels define a first fulcrum point and the main set of wheels define a second fulcrum point such that, in response to the lifting device being reclined to lift the object to be lifted from a surface, the maneuvering set of wheels disengage the surface and the main set of wheels engage the surface.

11. The lifting device of claim 10, wherein, prior to reclining the lifting device, the at least one arm wheel and the maneuvering set of wheels contact the surface.

12. A lifting device comprising:
a lifting mechanism slidably engaging a track, the track having a base portion, the lifting device having an upright position wherein an angle is defined between the track and a surface from which an object is to be lifted and being movable to a reclined position wherein the angle defined between the track and the surface from which the object is to be lifted is increased;
a first set of wheels coupled to the base portion of the track;
a second set of wheels coupled to the base portion of the track, the second set of wheels being positioned to engage the surface from which the object is to be lifted when the lifting device is in the upright position, an axis of rotation for the first set of wheels being substantially parallel to an axis of rotation of the second set of wheels and the axis of rotation of the second set of wheels being positioned between the axis of rotation of the first set of wheels and the lifting mechanism in the upright and reclined positions, the first set of wheels being positioned to be disengaged from the surface when the lifting device is in the upright position and wherein, in response to the lifting device being moved to the reclined position to lift the object from the surface, the second set of wheels disengage the surface and the first set of wheels engage the surface, wherein the first and the second set of wheels are coupled to different axles, vertically offset from each other;
at least two arms extending outwardly from the base portion of the track and extending in a direction of an object to be lifted;
a third set of wheels coupled to the at least two arms, wherein the axle for the second set of wheels is positioned between the axle for the first set of wheels and the third set of wheels; and
a foot anchor point disposed on the base portion, wherein the axles for the first and the second set of wheels are located between the foot anchor point and the lifting mechanism.

13. The lifting device of claim 12, wherein the first set of wheels are larger than the second set of wheels.

14. The lifting device of claim 12, wherein the lifting mechanism further comprises at least one orientation mechanism.

* * * * *